United States Patent
Faher et al.

(10) Patent No.: US 12,254,103 B2
(45) Date of Patent: Mar. 18, 2025

(54) SECURITY MECHANISM FOR NAMESPACES USED IN ELECTRONIC IDENTIFICATION ON MOBILE DEVICES

(71) Applicant: THALES DIS FRANCE SAS, Meudon (FR)

(72) Inventors: Mourad Faher, Marly le Roi (FR); Carole Bayle, Marseilles (FR)

(73) Assignee: THALES DIS FRANCE SAS, Meudon (FR)

( * ) Notice: Subject to any disclaimer, the term of this patent is extended or adjusted under 35 U.S.C. 154(b) by 272 days.

(21) Appl. No.: 17/767,153

(22) PCT Filed: Sep. 25, 2020

(86) PCT No.: PCT/EP2020/076906
§ 371 (c)(1),
(2) Date: Apr. 7, 2022

(87) PCT Pub. No.: WO2021/073853
PCT Pub. Date: Apr. 22, 2021

(65) Prior Publication Data
US 2022/0374533 A1  Nov. 24, 2022

(30) Foreign Application Priority Data
Oct. 18, 2019 (EP) .................................. 19306357

(51) Int. Cl.
*G06F 21/62* (2013.01)
*G06Q 50/26* (2024.01)
*H04L 9/40* (2022.01)

(52) U.S. Cl.
CPC ............ *G06F 21/62* (2013.01); *H04L 63/101* (2013.01); *H04L 63/20* (2013.01); *G06Q 50/265* (2013.01)

(58) Field of Classification Search
CPC ....... G06F 21/62; H04L 63/101; H04L 63/20; G06Q 50/265; G06Q 20/3227;
(Continued)

(56) References Cited

U.S. PATENT DOCUMENTS 10,922,386 B1 * 2/2021 Li ............................ G06F 21/53
11,973,758 B2 * 4/2024 Baryshnikov ........... H04L 63/10
(Continued)

FOREIGN PATENT DOCUMENTS

KR   1020190115361 A   10/2019
WO   WO2015/036957 A1   3/2015

OTHER PUBLICATIONS

International Search Report (PCT/ISA/210) and Written Opinion (PCT/ISA/237) mailed on Nov. 20, 2020, by the European Patent Office as the International Searching Authority for current International Application No. PCT/EP2020/076906—[16 pages].
(Continued)

*Primary Examiner* — Richard G Keehn

(57) ABSTRACT

A system, mobile device, and method for managing security policies for data items stored in an electronic identification (eID) wallet on the mobile device. Security policies are associated with each of a plurality of supported namespaces on a mobile device and a verifier terminal operates to select a namespace to access a data item stored on the mobile device based on the security policies associated with the plurality of supported namespaces on the mobile device.

16 Claims, 9 Drawing Sheets

(58) Field of Classification Search
CPC .. G06Q 20/326; G06Q 20/363; G06Q 20/367; G06Q 20/3825; G06Q 20/3827; G06Q 20/4014

See application file for complete search history.

(56) References Cited

U.S. PATENT DOCUMENTS

| | | | |
|---|---|---|---|
| 2006/0265508 A1* | 11/2006 | Angel | H04L 61/2567 709/230 |
| 2009/0006642 A1* | 1/2009 | Dickens | H04L 65/611 709/231 |
| 2012/0159195 A1* | 6/2012 | Von Behren | G06F 21/62 713/193 |
| 2015/0040180 A1* | 2/2015 | Jacobson | G06F 21/62 726/1 |
| 2016/0055248 A1* | 2/2016 | Goel | G06F 21/6218 707/770 |
| 2016/0156386 A1 | 6/2016 | Van Nieuwenhuyze et al. | |
| 2016/0294831 A1 | 10/2016 | Borunda et al. | |
| 2020/0391695 A1 | 12/2020 | Yang et al. | |
| 2022/0374533 A1* | 11/2022 | Faher | G06Q 20/326 |

OTHER PUBLICATIONS

EMVCO: "EMV '96 Integrated Circuit Card Application Specification for Payment Systems", EMV, EMVCO vol. 3.1.1 ; Contact, Jul. 1, 2006 (Jul. 1, 2006), pp. 1-62, XP061034511, Retrieved from the Internet: URL:https://www.emvco.com/wp-content/uploads/documents/Emvapp_20090126073328.pdf [retrieved on Jan. 6, 2020]—p. 15-p. 16.

Anonymous: Thales lance son nouveau portefeuille d'identité numérique—vos documents d'identité accessibles où que vous soyez "Thales Group", Jul. 29, 2019 (Jul. 29, 2019), pp. 1-7, XP055689283, Retrieved from the Internet: URL:https://www.thalesgroup.com/fr/group/journaliste/press_release/thales-lance-son-nouveau-portefeuille-didentite-numerique-vos [retrieved on Apr. 24, 2020) the whole document.

* cited by examiner

| First byte | | | | | | | | |
|---|---|---|---|---|---|---|---|---|
| b8 | b7 | b6 | b5 | b4 | b3 | b2 | b1 | |
| | | | | | | | | Value determining the version of this template (for extensibility and interoperability) |
| Second byte | | | | | | | | |
| b8 | b7 | b6 | b5 | b4 | b3 | b2 | b1 | value denoting the authentication protocol required |
| | | | | | | | | e.g. digital signature |
| | | | | | | | | e.g. reader authentication |
| | | | | | | | | e.g. certificate verification |
| | | | | | | | | e.g. secure messaging |
| | | | | | | | | e.g. role authentication |
| | | | | | | | | e.g. user consent ... |
| Third byte | | | | | | | | NOTE: could be a coded over a nibble of the first byte if allowed |
| b8 | b7 | b6 | b5 | b4 | b3 | b2 | b1 | value denoting the HASH type |
| | | | | | | | | e.g. SHA-256 |
| | | | | | | | | e.g. SHA-384 |
| | | | | | | | | e.g. SHA-512 |
| | | | | | | | | ... |
| Fourth byte | | | | | | | | |
| b8 | b7 | b6 | b5 | b4 | b3 | b2 | b1 | value denoting the signature scheme |
| | | | | | | | | e.g. RSA |
| | | | | | | | | e.g. ECDSA |
| | | | | | | | | ... |
| Fifth byte | | | | | | | | |
| b8 | b7 | b6 | b5 | b4 | b3 | b2 | b1 | value denoting secure messaging options |
| | | | | | | | | e.g. AES 128 bits - CMAC |
| | | | | | | | | e.g. AES 128 bites – EMAC |
| | | | | | | | | e.g. AES-GCM ... |

SECURITY MECHANISM FOR NAMESPACES USED IN ELECTRONIC IDENTIFICATION ON MOBILE DEVICES

BACKGROUND OF THE INVENTION

The present invention relates, generally, mobile devices operating electronic identification (eID) wallet applications, and, more particularly, to security mechanisms for namespaces used to access data in eID wallet applications.

Mobile devices such as telephones and tablets provide users with many benefits that have allowed them to eliminate other devices and cards. For example, electronic wallets have allowed users to dispense with carrying many credit cards and enable users to load travel boarding passes and other tickets onto their mobile phones. Another emerging technology, known as electronic identification (eID), provides the ability to use mobile devices to store identification documents such as driver licenses, passports, national ID cards, university ID cards, and club membership cards.

At least one standard proposal for eID specifies the use of namespaces for accessing data stored in mobile Driving License application. ISO/IEC CD2 18013-5:2019, *Personal Identification—ISO-Compliant Driving Licence—Part 5: Mobile Driving Licence (mDL) application*. A namespace is a symbolic mechanism for organizing and identifying pieces of data. To access a piece of data a requestor specifies namespace identifier and a local name (unique within the namespace but not necessarily unique with respect to other namespaces).

Thus, using namespaces, within an eID wallet one or more eID applications may each have its own namespace that specifies the names of data managed by the eID application.

While multiple eID applications and associated namespaces managed by a mobile device can satisfy the same identification task, e.g., providing the age of a user, the level of confidence that a verifier associates with these multiple applications and namespaces may not be the same. For example, a government issued eID would typically provide a higher level of confidence than a club associated with a leisure activity.

Furthermore, eID applications may have security policy requirements before the eWallet allows access to the particular eID application and the information that it manages. Some such security policy requirements, e.g., cryptographic signatures of access requests, may be deemed overly cumbersome by certain attribute verifiers or a verifier may not be able to satisfy the requirements.

To allow a verifier to determine which namespace from which to request access, it is desirable to have a technology which allows uniform communication of namespaces available from a mobile device and namespace security policy access rules associated with such namespaces.

SUMMARY

A technology for managing security policies for data items stored in an electronic identification (eID) wallet on a mobile device provides for associating security policies with each of a plurality of supported namespaces on a mobile device and operating a reader executing a reader module to communicate with the mobile device and to select a namespace to access a data item stored on the mobile device based on the security policies associated with the plurality of supported namespaces on the mobile device. In an aspect, technology for managing security policies for data items stored in an electronic identification (eID) wallet on a mobile device includes transmitting a list of supported namespaces to the verifier module executing on the verifier and selecting, by the verifier module, at least one candidate namespace from the list of supported namespaces based on confidence the verifier assigns to the namespace, whitelisting or blacklisting of namespaces, or overhead associated with satisfying the security policy of a namespace.

In a further aspect, a list of supported namespaces is transmitted to the verifier module and the verifier module selects at least one candidate namespace by displaying a dialog window on a verifier terminal user interface allowing an operator to select a namespace. In an aspect, prior to transmitting a list of supported namespaces to a verifier terminal via the reader, the mobile device filters out any namespaces that the user selects to not transmit and only transmitting those namespaces that the user has acquiesced to having transmitted to the verifier terminal.

The security policy of each of the plurality of supported namespaces maybe transmitted from the mobile device to the reader, for examples, as a sequence of bytes having bits identifying required authentication protocol, bit values denoting required HASH type, bit values denoting required signature scheme, or bit values denoting secure messaging options. The required authentication may be selected from one or more of digital signature, reader authentication, certificate verification, secure messaging, role authentication, and user consent.

In an aspect, the reader operates to select a namespace to access a data item from the plurality of supported namespaces on the mobile device based on confidence the verifier associates with each namespace in the plurality of supported namespaces, for example, by selecting a namespace to access a data item from the plurality of supported namespaces on the mobile device based on a whitelist of namespaces by which the reader selects a namespace based on the namespace being in the whitelist of namespaces or a blacklist of namespaces by which the reader does not select a namespace based on the namespace being in the blacklist.

In an aspect, the data item stored on the mobile device is stored in a hardware memory and wherein the association of security policies and namespaces is stored in a hardware memory, the technology further including operating a processor of the mobile device to transmit a list of supported namespaces and associated security policies to the verifier terminal.

To achieve those and other advantages, and in accordance with the purpose of the invention as embodied and broadly described, the invention proposes a method for managing security policies for data items stored in an electronic identification eID wallet on a mobile device, comprises the following steps:

associating security policies with each of a plurality of supported namespaces on a mobile device; and operating a reader executing a reader module to communicate with the mobile device and to select a namespace to access a data item stored on the mobile device based on the security policies associated with the plurality of supported namespaces on the mobile device.

In an aspect, the method for managing security policies for data items stored in an electronic identification eID wallet on a mobile device comprises the following steps:

transmitting a list of supported namespaces to the verifier module executing on the verifier; and selecting, by the verifier module, at least one candidate namespace from the list of supported namespaces based on confidence the verifier assigns to the namespace, whitelisting or blacklisting of namespaces, or overhead associated with satisfying the security policy of a namespace.

In an aspect, the method for managing security policies for data items stored in an electronic identification eID wallet on a mobile device, comprising the following steps:
  transmitting a list of supported namespaces to the verifier module; and
  selecting, by the verifier module, at least one candidate namespace by displaying a dialog window on a verifier terminal user interface allowing an operator to select a namespace.

In an aspect, the method for managing security policies for data items stored in an electronic identification eID wallet on a mobile device further comprising the following steps:
  prior to transmitting a list of supported namespaces to a verifier terminal via the reader, filtering out any namespaces that the user selects to not transmit and only transmitting those namespaces that the user has acquiesced to having transmitted to the verifier terminal.

In an aspect, the method for managing security policies for data items stored in an electronic identification eID wallet on a mobile device further comprising the following step of transmitting the security policy of each of the plurality of supported namespaces from the mobile device to the reader.

In an aspect, the method for managing security policies for data items stored in an electronic identification eID wallet on a mobile device wherein the security policy is transmitted as a sequence of bytes having bits identifying required authentication protocol, bit values denoting required HASH type, bit values denoting required signature scheme, or bit values denoting secure messaging options.

In an aspect, the method for managing security policies for data items stored in an electronic identification eID wallet on a mobile device wherein the required authentication may be selected from one or more of digital signature, reader authentication, certificate verification, secure messaging, role authentication, and user consent.

In an aspect, the method for managing security policies for data items stored in an electronic identification eID wallet on a mobile device further comprises operating the reader to select a namespace to access a data item from the plurality of supported namespaces on the mobile device based on confidence the verifier associates with each namespace in the plurality of supported namespaces.

In an aspect, the method for managing security policies for data items stored in an electronic identification eID wallet on a mobile device further comprises operating the reader to select a namespace to access a data item from the plurality of supported namespaces on the mobile device based on a whitelist of namespaces by which the reader selects a namespace based on the namespace being in the whitelist of namespaces or a blacklist of namespaces by which the reader does not select a namespace based on the namespace being in the blacklist.

In an aspect, the method for managing security policies for data items stored in an electronic identification eID wallet on a mobile device wherein the data item stored on the mobile device is stored in a hardware memory and wherein the association of security policies and namespaces is stored in a hardware memory, the method further comprising operating a processor of the mobile device to transmit a list of supported namespaces and associated security policies to the verifier terminal.

Another aspect of the invention is a mobile device comprising:
  a processor; and
  a memory for storing instructions executable by the processor and for storing electronic identity eID data, the memory including an eID wallet application having instructions to cause the processor to:
    receive a list of selected namespaces from a reader;
    in response to receiving the list of selected namespaces from the reader, transmitting security rules associated with each selected namespace according to a defined bytestring template.

In an aspect, the eID wallet application further comprises instruction to cause the processor to:
  receive a request for supported namespaces from a reader;
  transmit a list of supported name spaces to the reader.

In an aspect, the eID wallet application further comprises instruction to cause the processor to:
  prior transmitting a list of supported namespaces to a reader, filter out any namespaces that the user selects to not transmit and only transmitting those namespaces that the user has acquiesced to having transmitted to the reader.

In an aspect, the eID wallet application further comprises instruction to cause the processor to:
  transmit the security policy of each of the plurality of supported namespaces to a reader connected to a verifier.

In an aspect, the eID wallet application wherein the security policy is transmitted as a sequence of bytes having bits identifying required authentication protocol, bit values denoting required HASH type, bit values denoting required signature scheme, or bit values denoting secure messaging options.

In an aspect, the present relates to a method for managing security policies for data items stored in an electronic identification (eID) wallet on a mobile device, comprising:
  associating a security policy with each of a plurality of supported namespaces on a mobile device;
  transmitting the security policy of each of the plurality of supported namespaces to a reader connected to a verifier;
  selecting, by the reader, at least one of the namespaces as candidate namespaces, and transmitting from the reader to the mobile device, a list containing the candidate namespaces;
  transmitting to the reader by the mobile device, the security policy associated with each of the selected candidate namespaces;
  operating the reader to:
  determine for which of the candidate namespaces the reader can satisfy the security policy of the namespace; and
  if the verifier can satisfy the security policy of at least one candidate namespace, selecting one of the candidate namespaces for which the verifier terminal can satisfy the security policy, to access a data item, and demonstrating satisfaction of the security policy to the mobile device;
  if the verifier cannot satisfy the security policy of any of the candidate namespaces, rejecting access to the data item; and
  upon successful demonstration by the reader to the mobile device of satisfaction of the security policy of the selected namespace, granting access to the data item by the mobile device to the reader.

BRIEF DESCRIPTION OF THE DRAWINGS

FIG. 7 is a table illustrating an example protocol for namespace-security-policy messages.

DETAILED DESCRIPTION OF THE INVENTION

Figure 1:
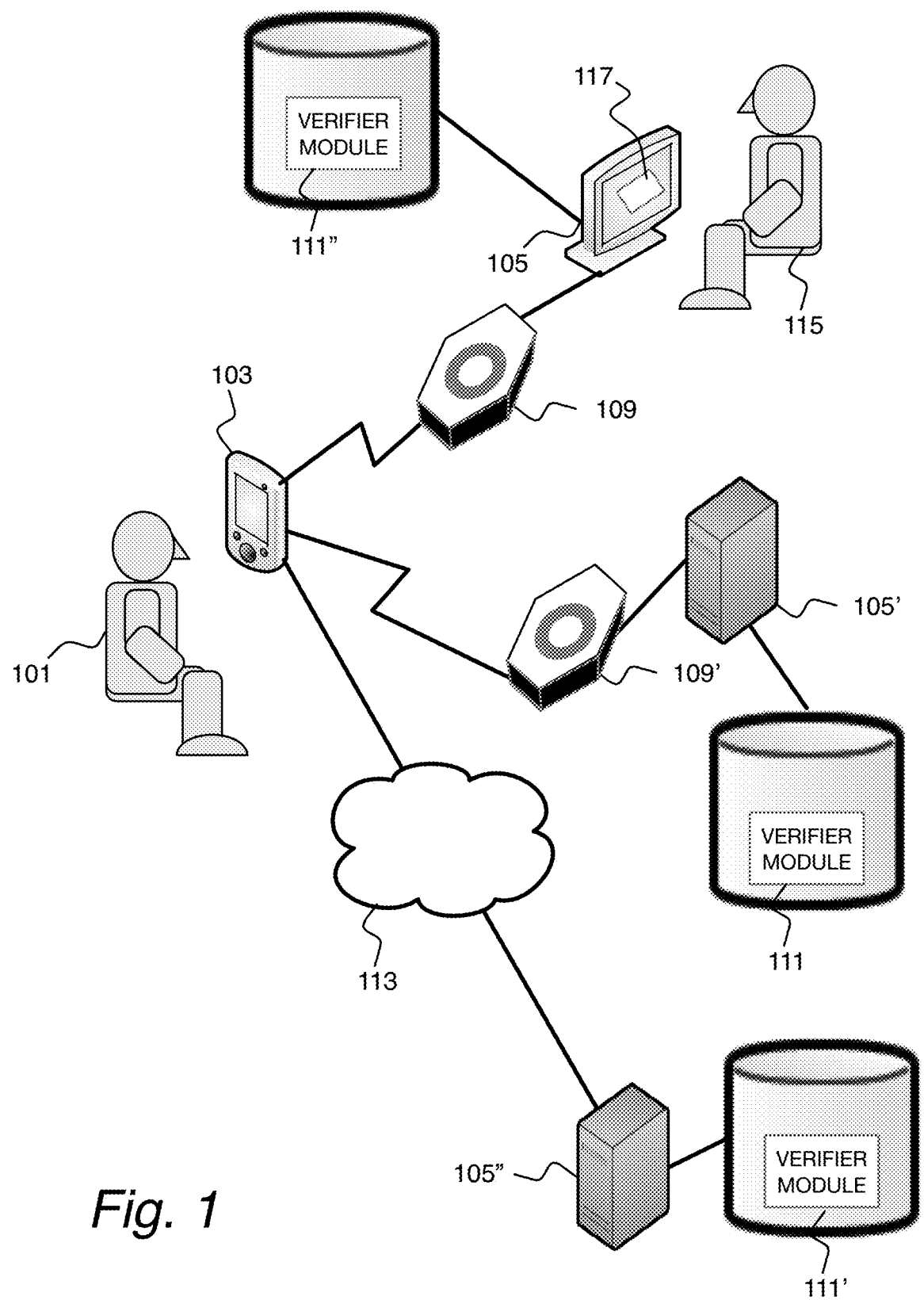
FIG. 1 is a schematic illustrating an exemplary use case scenario.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following description includes references to various methods executed by a processor of mobile device or a terminal, known herein as the reader or the verifier. As is common in the field, there may be phrases herein that indicate these methods or method steps are performed by software instructions or software modules. As a person skilled in the art knows, such descriptions should be taken to mean that a processor, in fact, executes the methods, software instructions, and software modules.

The herein described technology provides mechanisms to provide discoverability of security policies for electronic identification data organized in namespaces on mobile devices with total abstraction of the data structures used on the mobile devices. As such the technology provides an improvement to mobile devices used for electronic identification purposes and the overall system of electronic identification by providing technology by which security access rules may be assigned to namespaces that are used to address electronic identification data stored on mobile devices when mobile devices are used to make identity-based identification or attribute assertions whereby electronic identification readers and verifiers may select appropriate namespaces hosted by electronic devices for verifying electronic identification-based attribute assertions. The technology improves a mobile device by providing such devices the ability to offer more flexibility in assignment of security policies and communication of such security policies to readers and verifiers of electronic identification data.

First a use case. There are many instances in which an individual seeks to establish an attribute that will allow that individual a certain privilege. That may be an access to a restricted physical space, the right to participate in a program, access to a private or age-restricted material, or access to an attribute-restricted benefit. A reduced fare only available to students and senior citizens is an example of an attribute-restricted benefit.

Suppose, a person wishing to travel on a metro system is entitled to a 50% discount if the person is either a student or a senior citizen. A person may have on her mobile device several eID applications that may be useful to demonstrate satisfaction of one or both of the requirements for reduced fare, e.g.:

- a government issued identity card, for example, from AGENCE NATIONALE DES TITRES SÉCURISÉS (ants.gouv.fr; French National Agency for Secure Documents) or TEXAS DEPARTMENT OF PUBLIC SAFETY (dps.texas.gov)
- a university departmental ID, for example, University of Pau (univ-pau.fr) or University of Texas (utexas.edu)
- a club for a leisure activity, for example, a stamp collection club (pau-philatelie.asso.org) or a garden club (merryweeders.org)

Each of the eID applications may store information that can be used to prove that a person is a student or of a certain age; e.g., the government ID typically store birthdates and may have a professional status (e.g., retired or student), the university ID would certainly indicate if a person is a student, faculty or alumnus, and even the stamp club may charge a different membership fee for students and therefore have a flag set for a member being a student, and the garden club may store birthdates so that they can celebrate members on their respective birthdays.

When the prospective passenger wishes to purchase a monthly pass for the metro, they presents their mobile device to a ticket vendor, which may either be an automatic ticket self-use vending terminal or an individual employee of the metro authority, who would operate a verification terminal. If the passenger is a student or senior, the passenger offers his or her eID wallet to prove that fact. The passenger or the metro official places the mobile device on a terminal.

The eID wallet communicates the desired attribute to the terminal and the terminal decides whether to grant the discount or not.

FIG. 1 is a schematic illustrating the above-described use-case example scenario and alternatives. A user 101 operates a mobile device 103, e.g., a mobile telephone. The mobile device 103 contains an eID wallet with one or more eID applications (see FIG. 2). The eID functionality of the mobile device 103 may be used by the user 101 to prove identity or an identity-related attribute to a verifier. The verifier may be a human verifier 115 interacting with reader 109 and a verifier computer 105 via a user interface 117 connected to a reader 109. For example, if the user 101 seeks to obtain access to a facility based on a membership status, the user 101 may present the mobile device 103 to a security guard (human verifier) 115. A verifier module 111", executable by the reader 109 or the verifier 105, provides the dialog user interface 117 to the human verifier 115 to verify proffered identification from the user 101.

Alternatively, the verifier may be performed automatically when the user 101 places the mobile device 103 on the reader 109, for example, of the reader 109 is connected to an automated verifier 105', executing a software verifier module 111', in communication with a reader 109'. While depicted here as separate units, the reader 109' and the verifier 105' may be one machine. An example may be a ticket vending machine in which a traveler has to demonstrate being a member of a particular age group.

In an alternative use case, the mobile device 103 is used to provide identity functionality over the internet 113 to a remote server 115 on which a verifier module 111 is executing.

Figure 2:
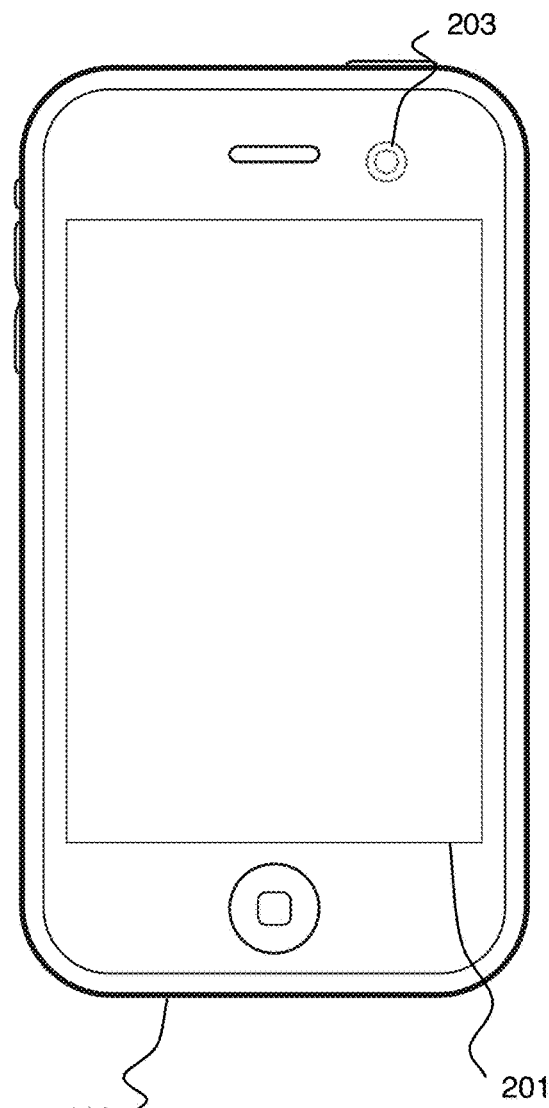
FIG. 2 is an external representation of a mobile device.
Figure 3:
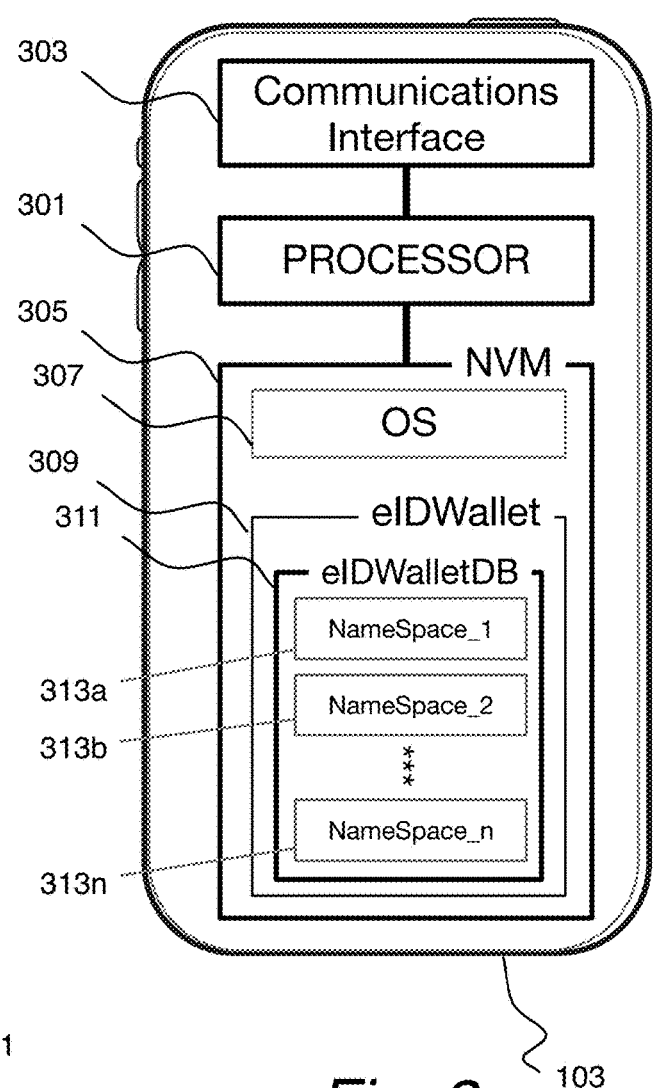
FIG. 3 is a block diagram illustrating major components of a hardware and software architecture for a mobile device.

FIG. 2 is an external representation of a mobile device 103 and FIG. 3 is a block diagram illustrating major components of a hardware and software architecture for a mobile device 103. The mobile device 103 contains a touch screen user interface 201 for receiving input from the user 101 and for providing output to the user 101 as well as a camera 203 by which the mobile device may receive input from a reader 109, e.g., by scanning QR codes or bar codes displayed on the reader 109.

As illustrated in FIG. 3, the mobile device 103 contains a processor 301, a communications interface 303, and a non-volatile memory (NVM) 305. The NVM 305 contains programs including an operating system 307 and application programs, referred to as "apps", which includes an eIDWallet app 309.

The communications interface 303, which may be used for mobile telephony, NFC, Bluetooth, WiFi, etc., allows the mobile device 103 to communicate with the reader 109 or the remote server 115. Alternatively, the mobile device 103 may communicate to the reader 109 via the screen 201 and camera 203 the reader 109 maybe an optical device that reads information transmitted via the screen 201 of the mobile device 103 and outputs information that the mobile device 103 may input via the camera 203.

The eIDWallet app 309 manages eIDWallet information, e.g., in an eIDWalletDB 311 organized around a number of namespaces 313a-n.

The architecture of FIG. 3 is merely one example. For example, in an alternative embodiment, there may be multiple eIDWallet apps each with its own namespace.

Each namespace provides access to a number of data elements and defines its own names for those data elements. An example namespace may be found in ISO/IEC CD2 18013-5:2019, *Personal Identification—ISO-Compliant Driving Licence—Part 5: Mobile Driving Licence (mDL) application*, section 7 "Data Model", incorporated herein by reference.

However, while two namespaces may contain the same data elements, these data elements may not have the same name in the two namespaces. For example, Date of birth (from the sample namespace in Appendix I) may be named BirthDate in another namespace. Similarly, two different data elements may provide an equivalent piece of information, e.g., Date of birth may be used to derive age.

Namespaces may be addressed in different ways, for example, URI, URL, URN, OID, UUID, or reverse domain namespace representation. In reverse domain representation, the namespace may be defined as reverseDomain.domainSpecificExtension. For example, for the French National Agency for Secure Documents, the reverse domain namespace identifier may be fr.gouv.ants.id, and for a stamp club, org.asso.philatelie.role.

Figure 4:
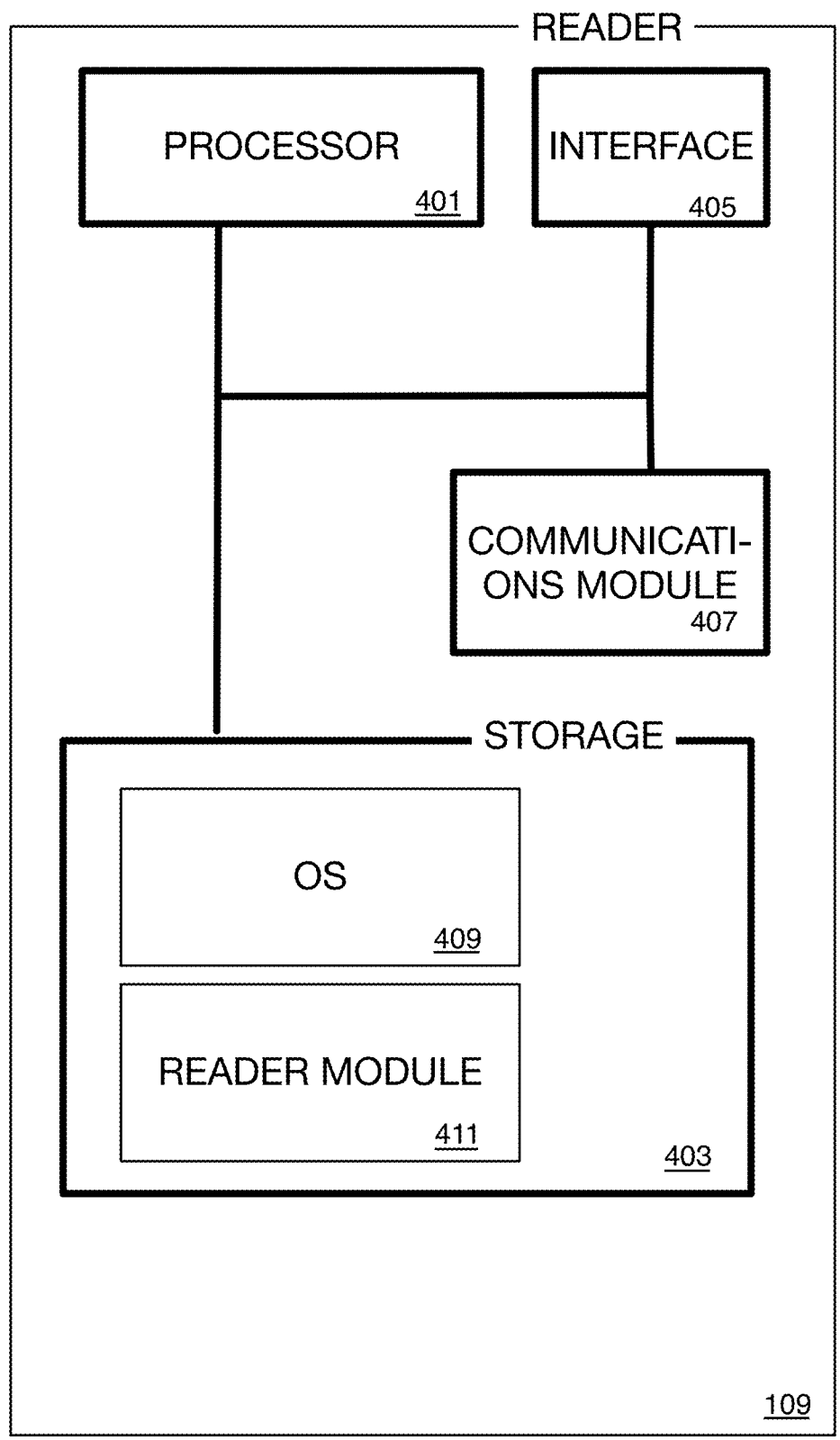
FIG. 4 is a block diagram illustrating one embodiment organization for a reader.

FIG. 4 is a block diagram illustrating one embodiment organization for a reader 109. The reader 109 includes a processor 401, a storage unit 403, an interface unit 405, for example, for interfacing with the processor of the verifier 105, and a communications module 407, for example, for NFC, WiFi, Bluetooth communication with the mobile device 103.

The storage unit 403 contains software modules including an operating system (OS) 409 and a reader module 411, which contains instructions to the processor 401 to carry out reader-side namespace selection as illustrated and described hereinbelow.

Figure 5:
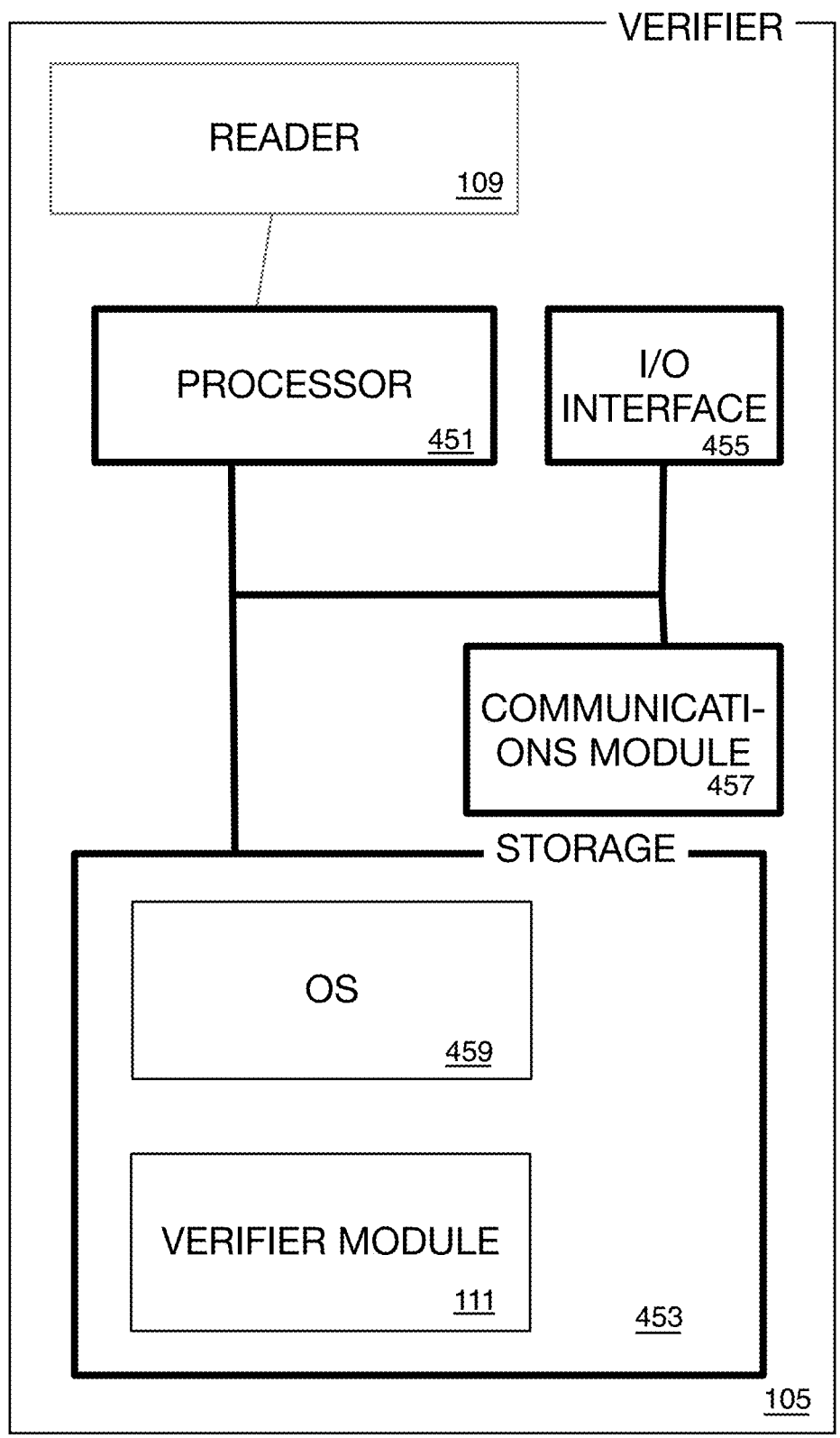
FIG. 5 is a block diagram illustrating one embodiment organization for a verifier that contains a reader of FIG. 4.

FIG. 5 is a block diagram illustrating one embodiment organization for a verifier 105. The verifier includes a processor 451, a storage unit 453, an input/output interface unit 405, for example, for interfacing with a user interface device for communicating with a human operator 115 or the user 101, and a communications module 457, for example, for NFC, WiFi, or Bluetooth communication with the mobile device 103. The storage unit 403 contains software modules including an operating system (OS) 459 and a verifier module 111 for carrying out tasks related to verifying an eID attribute assertion, for example, one related to verifying eligibility based on an attribute or identity.

Note, there are tasks of the reader module 411 as well as the verifier module 111 that may be carried out by a human operator. For example, as discussed in conjunction with the timing sequence diagram of FIG. 6 that follows hereinbelow, selection of a namespace based on level of security may be performed using a dialog with a human identity-based-assertion verifier (see, FIG. 1, 115). Accordingly, the verifier 105 may include an I/O interface 455 for connecting to user interface devices, such as a terminal for displaying graphic user interface elements 117.

Figure 6A:
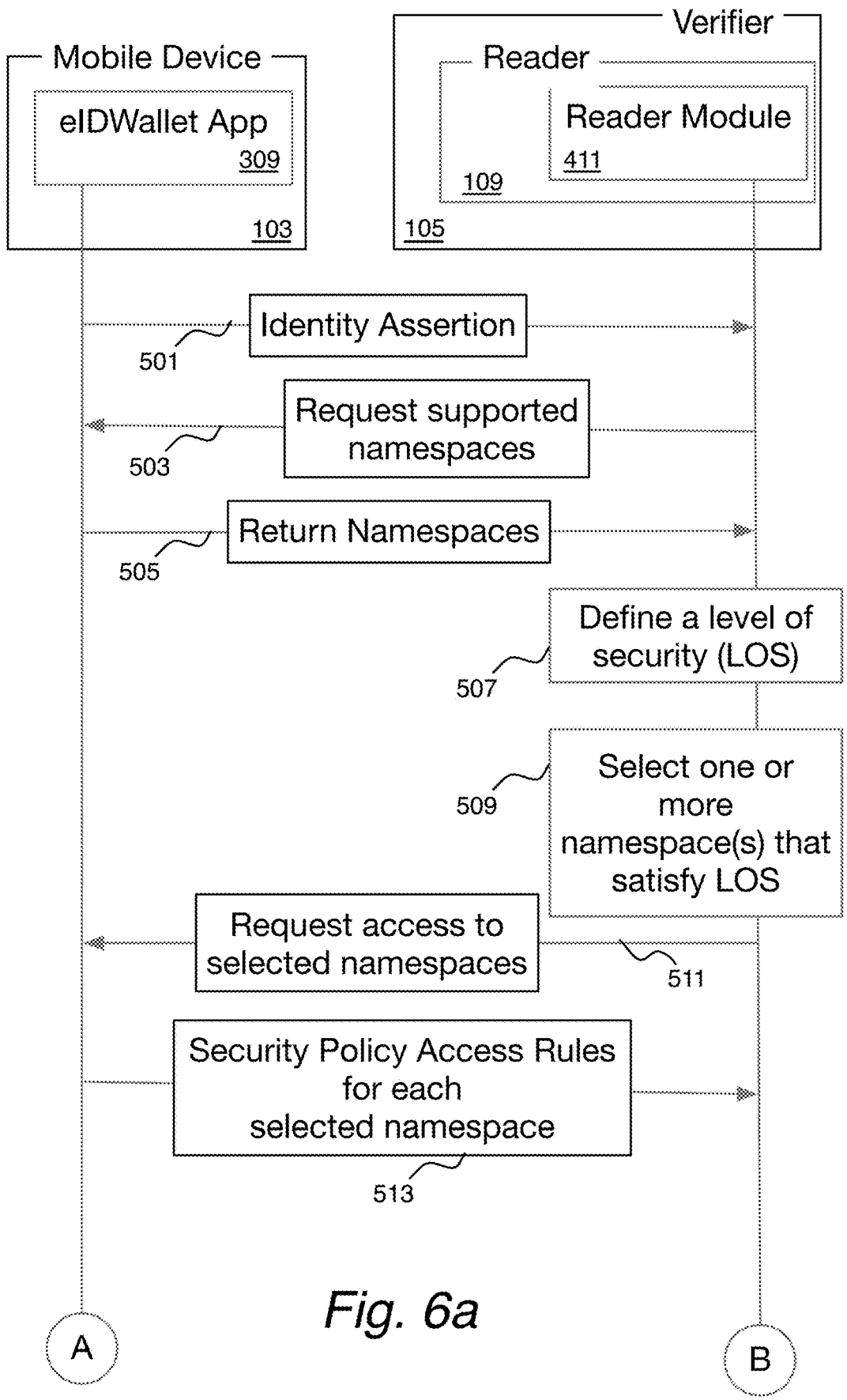
FIG. 6 (which is partitioned onto FIGS. 6a and 6b) is a timing sequence diagram illustrating a process for communicating namespaces available on a mobile device to a reader.
Figure 6B:
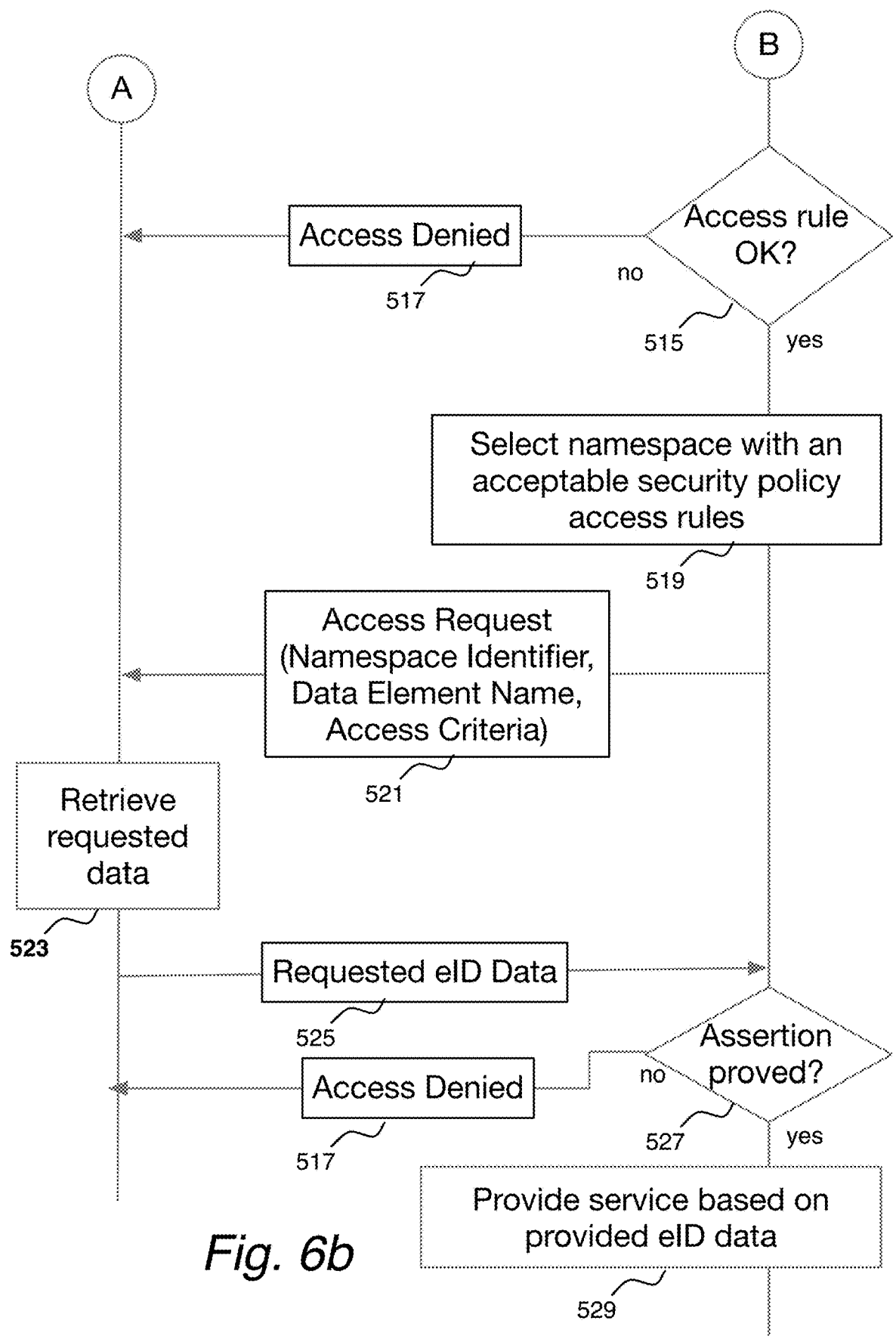

FIG. 6 (which is partitioned onto FIGS. 6a and 6b) is a timing sequence diagram illustrating a process for communicating namespaces available on a mobile device 103 to a verifier 105 including a reader 109. The process executed by the reader 109 may be under control of a software module referred to herein as the reader module 411. It should be noted that there is no strict demarcation between the reader 109 and verifier 105. Tasks described herein as performed by one may be performed by the other. Furthermore, the reader 109 and verifier 105 may be either completely separated or merged into one unit or any arrangement between those two extremes.

As a preliminary step a user 101 operating the mobile device 103 seeks to make an identity-based assertion, step 501. The identity-based assertion may be a request to access a service based on a certified attestation of an identity attribute, e.g., age, or to demonstrate that the user 101 is a particular person. The user 101 presents the mobile device 103, which contains and executes an eIDWallet app 309, to the reader 109 and a communications session, e.g., NFC, Bluetooth, WiFi, or optical transmission, is established between the mobile device 103 and the reader 109.

In response to the establishment of an eID communications session, the reader 109 responds by requesting from the mobile device 103 a listing of eID namespaces supported by the mobile device 103, step 503.

The mobile device 103 responds with a list of supported eID namespaces, step 505. The list may be a concatenation or structured set of namespace identifiers, for example, in the form of URI, URL, URN, OID, UUID, or reverse domain name representation. In an embodiment, the mobile device 103 requests confirmation by the user 101 that the user acquiesces to releasing particular namespaces to the reader 109 and verifier 105. For example, if one namespace that contains a birthdate is associated with a political organization, the user may prefer to not reveal membership in that organization to the reader 109 and verifier 105.

Using, for example, reverse domain name representation, for a French-citizen student at the University of Pau, France, who is a stamp collector, the mobile device 103 may return:

National identification: fr.gouv.ants.id (the French National Agency for Secure Documents)

Student identification: fr.edu.univ-pau.labo.profile (University of Pau)

Membership card in stamp club: org.asso.philatelie.role (Stamp collectors club)

Depending on the request for which the identity assertion (step 501) is made, the verifier 105 determines the level of security (LOS) that should be associated with the request, step 507. For example, a bank cashing a check may require an identity assertion associated with a national ID whereas for proving entitlement to a student fare, a university ID may be sufficient.

Based on the required LOS, the verifier 105 selects one or more namespaces that satisfy the required LOS, step 509, and sends a request for access to these namespaces to the mobile device 103, step 511. The verifier 105 may have a whitelist of namespaces that may be used to satisfy LOS for an identity-based assertion. For example, a metropolitan transit authority may accept national IDs as well as student IDs from local universities. Conversely, the verifier 105 may have a blacklist of namespaces that are not allowed to be used for an identity-based assertion; i.e., that are deemed to not meet the LOS required.

The mobile device 103 responds with the security policy access rules associated with each of the requested namespaces, step 513.

In a preferred embodiment, the security policies of namespaces are communicated according to a standard protocol or an interoperability template. The namespace-security-policy protocol may consist of a sequence of bytes in which each bit signifies a particular security policy attribute.

FIG. 7 is a table illustrating an example 601 protocol for namespace-security-policy messages.

In the example 601, the first byte is used to communicate a version number of the template used for communicating namespace security policy.

The second byte of the example template 601 contains a value for denoting the required authentication protocol. The first bit (b1) indicates whether digital signature is required or not. The second bit (b2) indicates whether reader authentication is required. The third bit (b3) is used to indicate whether certificate verification is required. The fourth bit (b4) is used to indicate whether secure messaging is required. The fifth bit (b5) is used to indicate whether role authentication is required. The sixth bit (b6) indicates whether user consent is required.

The third byte indicates the HASH type to be used. For example, first through third bit indicate to use SHA-256, SHA-384, and SHA-512, respectively. Other bits could be used to indicate alternative hashing schemes. No bit set indicates that hashing is not to be used.

The fourth byte indicates the scheme for digital signatures to be used. For example, the first and second bits indicate RSA and ECDSA, respectively. Other bits may indicate to use other digital signature schemes. No bit set indicates that digital signature is not required.

The fifth byte denotes which secure messaging option to use. The first through third bit indicate AES 128 bit-CMAC, AES 128 bit-EMAC, and AES-GCM, respectively. Other bits may indicate to use other secure messaging options. No bit set indicates that secure messaging is not required.

It should be noted that the template illustrated in FIG. 7 and described above is merely an example. Other arrangements are possible. For example, several of the bytes that only use a few bits to convey information can be combined.

Returning to FIG. 6, having received the security policy access rules (step 513), the reader 109 determines if there is at least one namespace with acceptable access rules, step 515. For example, if the mobile device 103 demands verification of a digital signature to access a namespace for verification of age to access a website, that may be considered too onerous by the verifier 105. Furthermore, if the verifier 105 may not have the capability to satisfy a demanding access rule and therefore be forced into requesting access to a namespace with a less demanding access rule. Accordingly, the verifier 105 may have, for example, selection rules such as to not select namespaces that require certificate verification or more than 128-bit encryption.

If there is no namespace provided by the mobile device 103 with acceptable level of confidence and acceptable access rules, the reader 109 may decline access to the service or benefit requested by the mobile device 103, step 515, and a message declining access to the requested service is transmitted to the mobile device 103, step 515.

Otherwise, the reader 109 selects a namespace with an acceptable security policy, step 519.

With the selected namespace, the reader satisfies the access rules required by the mobile device and sends an access request message with the namespace identifier, data element name (used by the namespace to address the required data element), required information or format according to the access rule for the namespace, e.g., certificate, hashed message, step 521.

In an embodiment, the namespace security policy representation 601 further contains additional information, e.g., a certificate route or digital information necessary to resolve certain cryptographic references. For example, the security policy access rules can be satisfied by the verifier 105 or reader 109 if the verifier/reader has references to, e.g., the cryptographic keys to use, a route to a Certificate Authority root public key (for certificate verification), or an object identifier (01D) denoting a crypto-suite to be performed by the verifier/reader. To provide this additional information, the namespace security policy template 601 transmitted in step 513 may be appended with a byte sequence providing the required data for the defined security mechanisms to allow access to eID data from the mobile device 103 corresponding to each of the bytes in the template.

Figure 8:
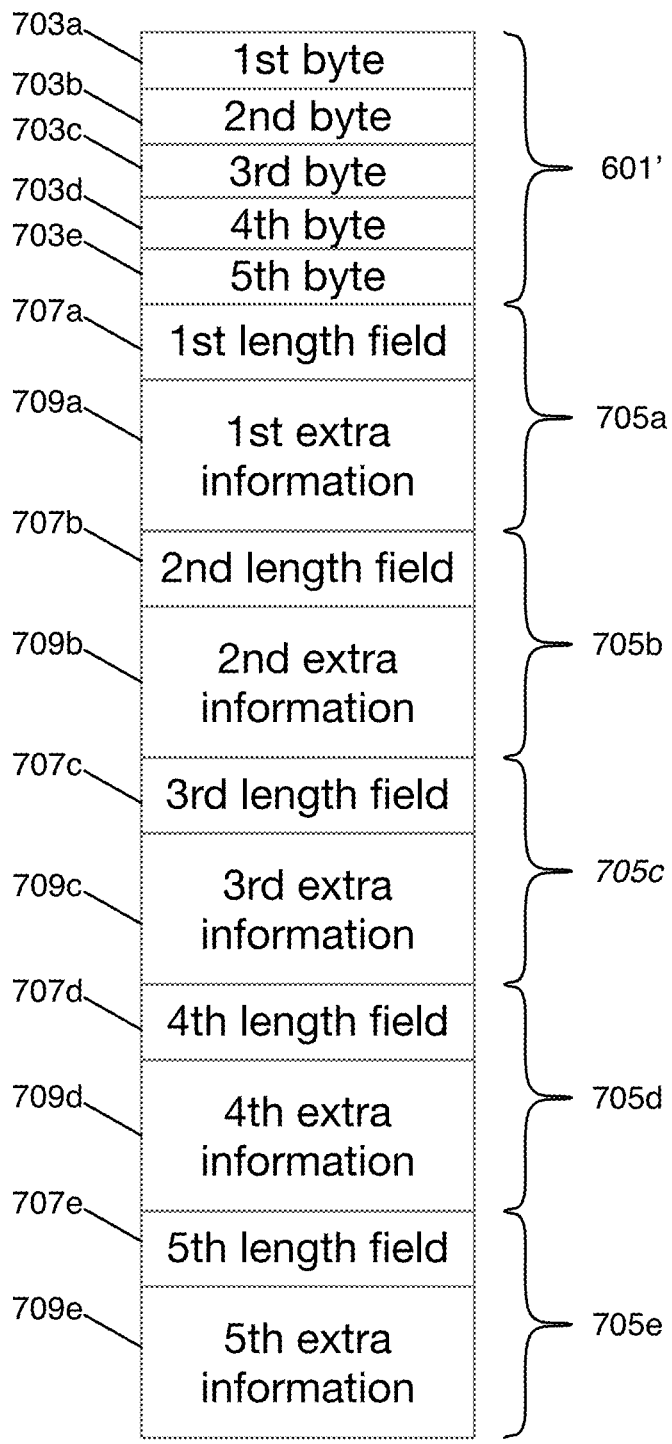
FIG. 8 is a block diagram of a namespace security representation containing a template and additional information byte sequences.

FIG. 8 is a block diagram of namespace security representation 701 containing a template 601' and additional information byte sequences 705a-e.

The example namespace security representation 701 contains the five bytes 703a-e corresponding to the five-byte template 601'. Each of these has a corresponding additional-information byte sequence 705a-e. Each of these additional byte sequences 705a-e are in length-value format, i.e., the first field 707a-e indicating the number of bytes of the value field 709a-e; a 0 value in the length field 707a-e indicates that there is no additional information sequence corresponding to a particular byte in the template and thus, the value field 709*a-e* would be an empty sequence.

There are many different possible syntaxes for the length fields. In a simple case, the length field is simply a fixed number of bytes, e.g., one or two bytes.

Thus, the security policy access rule communication may be:

$1^{st}$ byte$||2^{nd}$ byte$||3^{rd}$ byte$||4^{th}$ byte$||5^{th}$ byte$||$0x00$||$0x0C$||<$12 byte OID>>$||$0x00$||$0x08$||<$eight byte key>>$||$0x00 where
    the first five bytes correspond to the security policy access rules as described in conjunction with FIG. 7
    0x00 indicates a zero-length value field, i.e., no value, corresponding to the first byte 703*a*
    0x0C is the length filed with the hexadecimal value indicating that 12 bytes is to follow for additional information corresponding to the second byte 703*b*; in the example, the following 12 bytes is a representation of the OID denoting the crypto-suite applying the authentication protocol defined in the $2^{nd}$ byte of the security policy access rules
    The second 0x00 indicates that there is no additional information corresponding to the third byte 703*c*
    0x08 indicates that the following value field, corresponding to the fourth byte 703*d*, is eight bytes long and the following eight bytes, in this example, is an eight-byte cryptographic key
    the third 0x00 indicates that for the fifth byte 703*e* there is no additional information byte sequence Other mechanisms for indicating the length of the additional value field include using an escape sequence, e.g., 0xFF, to indicate that the following byte contains the length of the length field. For example, 0xFF020216 would indicate that the length field (0x02) is two bytes long and those two bytes indicate that the following byte sequence is 0x0216 (534) bytes long. Yet another mechanism is to have the first byte of each additional information sequence 705 indicate the length of the length field.

Figure 9:
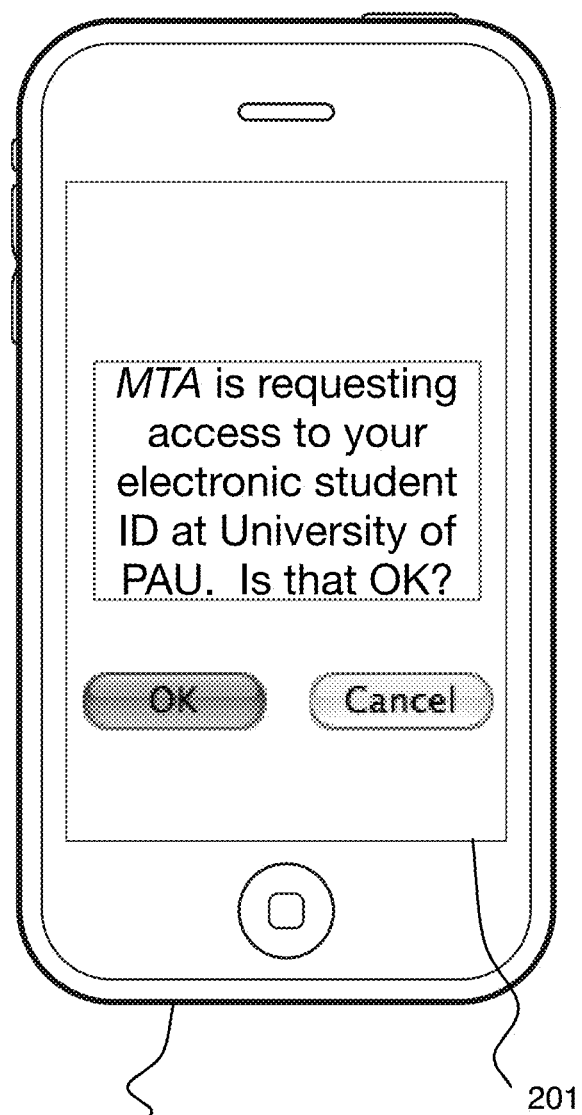
FIG. 9 is a diagram showing a dialog box displayed on a mobile device to obtain user acquiescence for use of a namespace.

As noted above, user consent may be one possible access rule. Thus, if user consent is required, the mobile device 103 may display on the user interface 201 a message to the user indicating the access request, for example, as indicated in FIG. 9, which is a diagram showing a dialog box displayed on a mobile device 103. If the user cancels, the access is denied. Conversely, the access to the requested service also not granted. However, in a follow-up dialog, the user 101 may be provided the opportunity to select another eID namespace for the identity-based assertion required by the reader 109.

Returning again to FIG. 6, if the reader 109 has satisfied the requirements of the access rules for the requested namespace, the eWallet app 309 of the mobile device 103 retrieves the required data using the namespace data element name provided, step 523, and provides identity-based assertion to the reader 109, step 525.

The reader 109 or verifier 105 then determines whether the identity-based assertion has been proved by the eID namespace, step 527. If the assertion has not been proved, access is denied, step 517. Otherwise, access to the requested service based on the identity-assertion made using the requested eID data element addressed using the selected namespace and data-element name (step 521), the access to the requested service or benefit is provided, step 529.

From the foregoing it will be apparent that an efficient and secure mechanism for associating security policy access rules with namespaces used in eID wallets is provided.

Although specific embodiments of the invention have been described and illustrated, the invention is not to be limited to the specific forms or arrangements of parts so described and illustrated. The invention is limited only by the claims.

We claim:

1. A method for managing security policies for data items stored in an electronic identification (eID) wallet on a mobile device, comprising:
    associating security policies with each of a plurality of supported namespaces on a mobile device; and
    operating a reader executing a reader module to communicate with the mobile device and to select a namespace to access a data item stored on the mobile device based on the security policies associated with the plurality of supported namespaces on the mobile device.

2. The method of claim 1 for managing security policies for data items stored in the electronic identification (eID) wallet on the mobile device, comprising:
    transmitting a list of supported namespaces to a verifier module executing on a verifier terminal; and
    selecting, by the verifier module, at least one candidate namespace from the list of supported namespaces based on confidence the verifier terminal assigns to the namespace, whitelisting or blacklisting of namespaces, or overhead associated with satisfying a security policy of the namespace from the security policies associated with the plurality of supported namespaces on the mobile device.

3. The method of claim 2 for managing security policies for data items stored in the electronic identification (eID) wallet on the mobile device further comprises
    operating the reader to select a namespace to access a data item from the plurality of supported namespaces on the mobile device based on confidence the verifier terminal associates with each namespace in the plurality of supported namespaces.

4. The method of claim 2 for managing security policies for data items stored in an electronic identification (eID) wallet on the mobile device,
    wherein the data item stored on the mobile device is stored in a hardware memory and wherein the association of security policies and namespaces is stored in a hardware memory, the method further comprising operating a processor of the mobile device to transmit a list of supported namespaces and associated security policies to the verifier terminal.

5. The method of claim 1 for managing security policies for data items stored in the electronic identification (eID) wallet on the mobile device, comprising:
    transmitting a list of supported namespaces to a verifier module; and
    selecting, by the verifier module, at least one candidate namespace by displaying a dialog window on a verifier terminal user interface allowing an operator to select a namespace.

6. The method of claim 1 for managing security policies for data items stored in the electronic identification (eID) wallet on the mobile device further comprising:
    prior to transmitting a list of supported namespaces to a verifier terminal via the reader, filtering out any namespaces that the user selects to not transmit and only transmitting those namespaces that the user has acquiesced to having transmitted to the verifier terminal.

7. The method of claim 1 for managing security policies for data items stored in the electronic identification (eID) wallet on the mobile device, comprising:
transmitting the security policy of each of the plurality of supported namespaces from the mobile device to the reader.

8. The method of claim 1 for managing security policies for data items stored in the electronic identification (eID) wallet on the mobile device,
wherein a security policy is transmitted as a sequence of bytes having bits identifying required authentication protocol, bit values denoting required HASH type, bit values denoting required signature scheme, or bit values denoting secure messaging options,
wherein the security policy is one of the security policies associated with the plurality of supported namespaces on the mobile device.

9. The method of claim 1 for managing security policies for data items stored in an electronic identification (eID) wallet on a mobile device,
wherein a required authentication is selected from one or more of digital signature, reader authentication, certificate verification, secure messaging, role authentication, and user consent.

10. The method of claim 1 for managing security policies for data items stored in an electronic identification (eID) wallet on the mobile device, further comprises
operating the reader to select a namespace to access a data item from the plurality of supported namespaces on the mobile device based on a whitelist of namespaces by which the reader selects a namespace based on the namespace being in the whitelist of namespaces or a blacklist of namespaces by which the reader does not select a namespace based on the namespace being in the blacklist.

11. A mobile device comprising:
a processor; and
a memory for storing instructions executable by the processor and for storing electronic identity (eID) data, the memory including an eID wallet application having instructions to cause the processor to:
receive a list of selected namespaces from a reader;
in response to receiving the list of selected namespaces from the reader, transmitting security rules associated with each selected namespace according to a defined bytestring template.

12. The mobile device of claim 11, wherein the eID wallet application further comprises instruction to cause the processor to:
receive a request for supported namespaces from the reader;
transmit a list of supported name spaces to the reader.

13. The mobile device according to claim 12, wherein the eID wallet application further comprises instruction to cause the processor to:
prior transmitting a list of supported namespaces to the reader, filter out any namespaces that the user selects to not transmit and only transmitting those namespaces that the user has acquiesced to having transmitted to the reader.

14. The mobile device according to claim 13, wherein the eID wallet application further comprises instruction to cause the processor to:
transmit a security policy of each of the plurality of supported namespaces to the reader connected to a verifier.

15. The mobile device according to claim 14, wherein the security policy is transmitted as a sequence of bytes having bits identifying required authentication protocol, bit values denoting required HASH type, bit values denoting required signature scheme, or bit values denoting secure messaging options.

16. A method for managing security policies for data items stored in an electronic identification (eID) wallet on a mobile device, comprising:
associating a security policy with each of a plurality of supported namespaces on a mobile device;
transmitting the security policy of each of the plurality of supported namespaces to a reader connected to a verifier;
selecting, by the reader, at least one of the namespaces as candidate namespaces, and transmitting from the reader to the mobile device, a list containing the candidate namespaces;
transmitting to the reader by the mobile device, the security policy associated with each of the selected candidate namespaces;
operating the reader to:
determine for which of the candidate namespaces the reader can satisfy the security policy of the namespace; and
if the verifier can satisfy the security policy of at least one candidate namespace, selecting one of the candidate namespaces for which the verifier terminal can satisfy the security policy, to access a data item, and demonstrating satisfaction of the security policy to the mobile device;
if the verifier cannot satisfy the security policy of any of the candidate namespaces, rejecting access to the data item; and
upon successful demonstration by the reader to the mobile device of satisfaction of the security policy of the selected namespace, granting access to the data item by the mobile device to the reader.

* * * * *